UNITED STATES PATENT OFFICE.

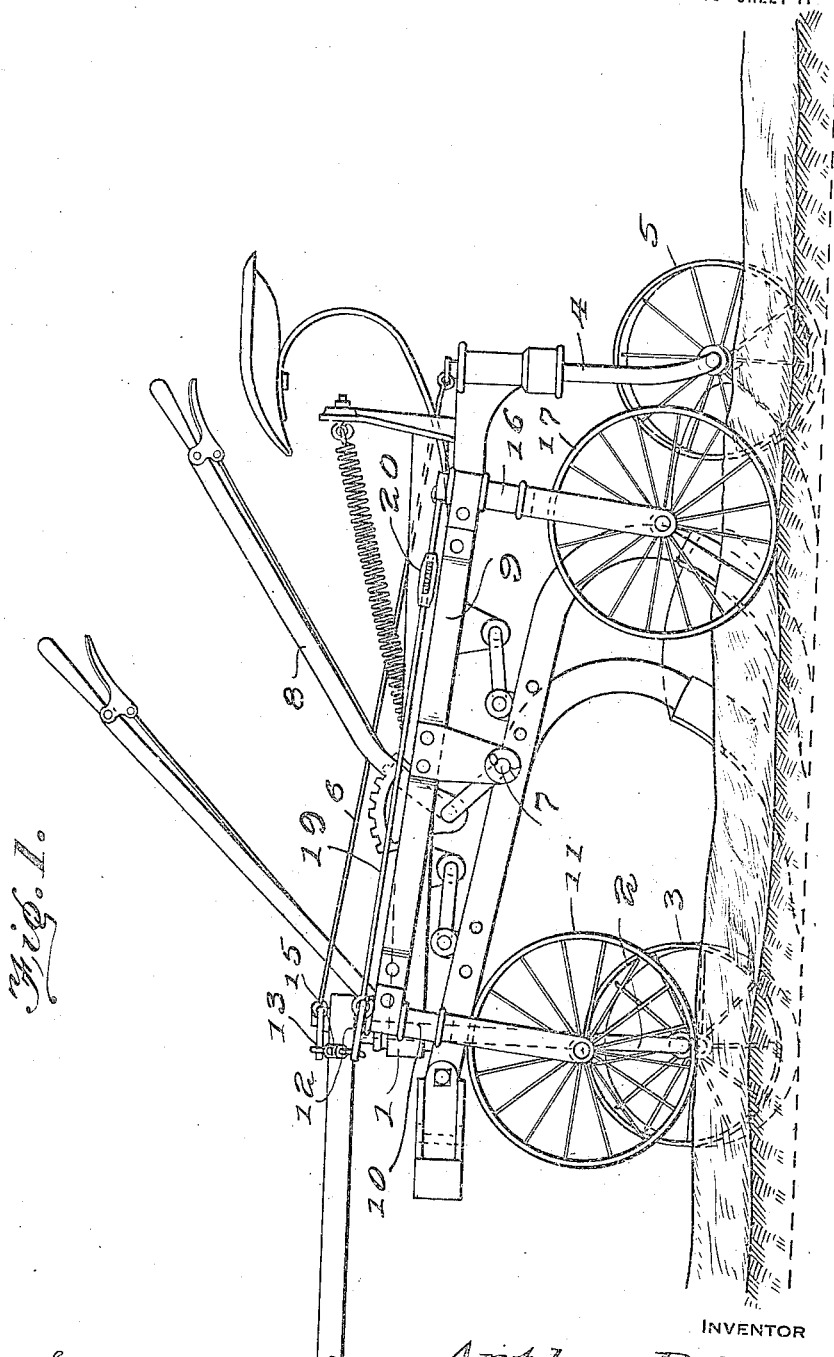

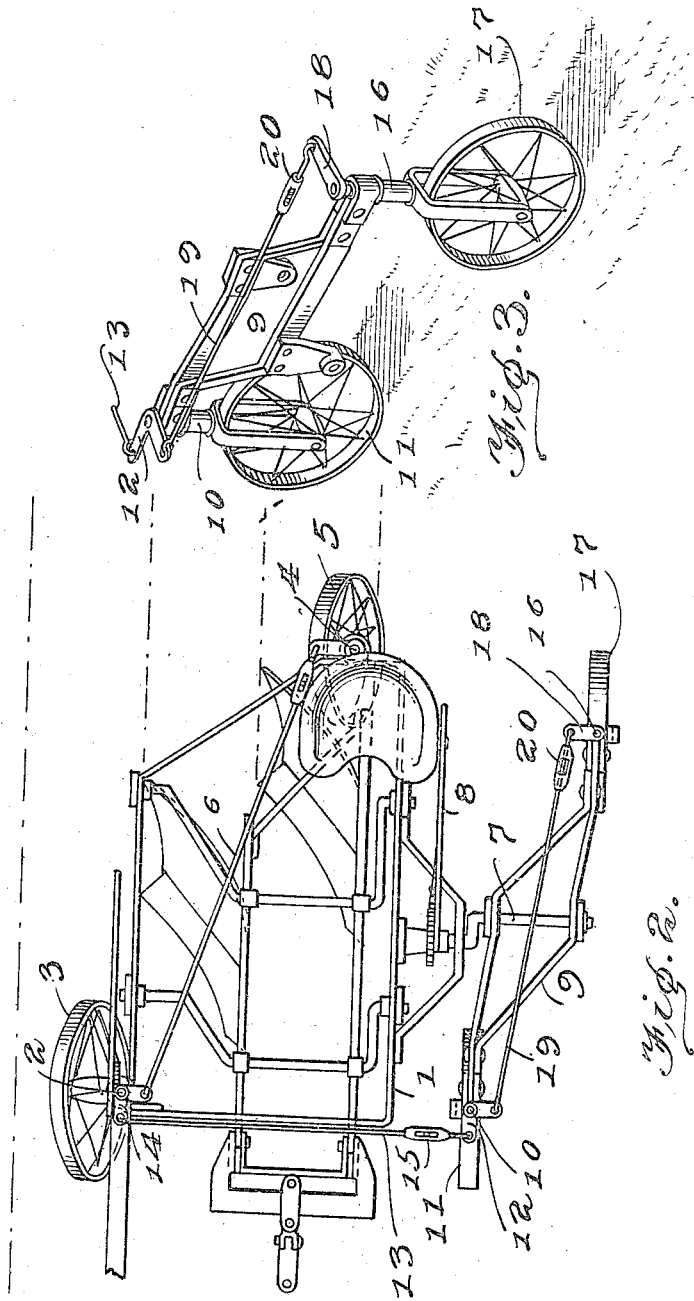

ARTHUR P. OWENS, OF BRADFORD, ILLINOIS.

PLOW DEPTH-REGULATOR.

1,253,089.                 Specification of Letters Patent.         Patented Jan. 8, 1918.

Application filed June 20, 1917. Serial No. 175,881.

*To all whom it may concern:*

Be it known that I, ARTHUR P. OWENS, a citizen of the United States, residing at Bradford, in the county of Stark and State of Illinois, have invented new and useful Improvements in Plow Depth-Regulators, of which the following is a specification.

This invention relates to an attachment adapted to be applied to a breaking plow for the purpose of regulating the depth at which the furrow opener will operate in the soil and to cause the said furrow opener to operate at a uniform depth in the soil and it consists in the novel features hereinafter described and claimed.

An object of the invention is to provide an attachment of the character stated which is of simple and durable structure and which includes a frame adapted to be pivotally mounted upon the axle of the land wheel of the plow. Spindles are journaled at the opposite ends of the said frame and land wheels are journaled upon the said spindles and are so arranged that they do not track one with the other. Turning means operatively connect the said spindles together and they also connect the spindles with the spindles or shafts of the furrow wheels whereby all of the said wheels are turned simultaneously as the plow is directed over the soil.

In the accompanying drawing:—

Figure 1 is a side elevation of a plow showing the depth regulator applied;

Fig. 2 is a top plan view of the same;

Fig. 3 is a perspective view of the regulator.

As illustrated in the accompanying drawing, the frame 1 to which the attachment is applied is of usual form employed in a sulky breaking plow. A spindle 2 is journaled at one side of the frame 1 and carries at its lower end a furrow wheel 3 which is adapted to travel in the furrow in advance of the plow bottoms in the usual manner. A spindle 4 is journaled at the rear portion of the frame 1 and carries at its lower end a furrow wheel 5 which is adapted to travel in the furrow behind the plow bottom. These spindles 2 and 4 are operatively connected together by means of a rod 6 in the usual manner whereby the said spindles turn simultaneously. The guiding tongue is operatively connected with the spindle 2 in a usual manner.

A land wheel axle 7 is journaled at the side of the frame 1 in a usual manner and is provided with the ordinary lever 8 adapted to be used for turning the said axle to raise or lower the side portion of the frame 1 with relation to the surface of the soil.

A substantially diamond shaped frame 9 is pivoted upon the axle 7 for free swinging movement. A vertical spindle 10 is pivoted to the forward end of the frame 9 and carries at its lower end a land wheel 11. A bell crank lever 12 is fixed to the upper end of the spindle 10 and a rod 13 connects one arm of the lever 12 with an arm 14 which is carried at the upper end of the spindle 2. The rod 13 is provided with a turn buckle 15 which may be manipulated for longitudinally extending or contracting the rod 13 in a usual manner. A spindle 16 is journaled at the rear end of the frame 9 and carries at its lower end a land wheel 17. The wheel 17 does not track with the wheel 11 but moves in a path at one side of the path in which the said wheel 11 travels. An arm 18 is carried at the upper end of the spindle 16 and a rod 19 connects the arm 18 with one of the arms of the lever 12. The said rod 19 is provided with a turn buckle 20 which may be manipulated whereby the said rod 19 may be extended or contracted longitudinally.

When the device is applied to a plow and the plow is moved over rough ground as for instance ground in which corn has been previously grown or ground in which grain as wheat or oats have been growing the wheel 11 may travel along a ridge while the wheel 17 may travel in a furrow or vice versa.

Should the wheel 11 travel along a ridge the forward end of the frame 9 will be elevated and in the event that the wheel 11 travels along a furrow the rear end of the frame 9 will be elevated. In either event the axle 7 is supported approximately the same distance from the surface of the soil and consequently the plow bottom or bottoms will operate at a uniform depth in the soil irrespective of the character of the surface of the soil over which the wheels 11 and 17 travel.

When the spindle 2 is turned to effect the turning of the plow the rod 13 will turn the spindle 10 and the rod 19 which connects the spindle 10 with the spindle 16 will turn the said spindle 16. Consequently the wheels 11 and 17 will turn in unison with the wheels 3 and 5 during the turning movement of the plow and hence the plow may be turned around in a small space notwithstanding the fact that the wheels 11 and 17 are spaced from each other.

From the foregoing description taken in conjunction with the accompanying drawing it will be seen that a plow depth regulator of simple and durable structure is provided and that the same may be conveniently used for maintaining the plow bottoms at a uniform depth in the soil without requiring repeated adjustment.

Having described my invention what is claimed is:—

In combination with a plow having a land wheel axle, and a furrow wheel spindle, a depth regulator comprising an approximately diamond shaped frame, depending bearings located at the opposite sides of the frame at points between the ends thereof and pivoted upon the land wheel axle of the plow for vertical swinging movement, one of the said bearings being located in front and the other behind a line which intersects the intermediate angles of the frame, spindles journaled at the ends of the frame, one at a point approximately in alinement with one side of the frame and the other at a point approximately in alinement with the opposite side of the frame, land wheels journaled upon the spindles, means operatively connecting the spindles together to cause them to turn simultaneously in opposite directions and means operatively connecting the forward spindle of the frame with the furrow wheel of the plow to cause all of the spindles to turn simultaneously.

In testimony whereof I affix my signature.

ARTHUR P. OWENS.

Copies of this patent may be obtained for five cents each, by addressing the "Commissioner of Patents, Washington, D. C."